United States Patent
Vu et al.

(10) Patent No.: US 11,140,368 B2
(45) Date of Patent: Oct. 5, 2021

(54) CUSTOM BEAMFORMING DURING A VERTICAL BLANKING INTERVAL

(71) Applicant: Advanced Micro Devices, Inc., Sunnyvale, CA (US)

(72) Inventors: Ngoc Vinh Vu, Cupertino, CA (US); David Robert Stark, Jr., New Braunfels, TX (US); Carson Ryley Reece Green, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 15/686,927

(22) Filed: Aug. 25, 2017

(65) Prior Publication Data
US 2019/0068926 A1 Feb. 28, 2019

(51) Int. Cl.
*H04N 7/20* (2006.01)
*H04L 29/06* (2006.01)
(Continued)

(52) U.S. Cl.
CPC .............. *H04N 7/20* (2013.01); *H01Q 3/00* (2013.01); *H04L 65/4069* (2013.01);
(Continued)

(58) Field of Classification Search
CPC ...... H04N 7/20; H04W 72/046; H04W 72/08; H04W 72/1231; H04B 7/0617; H01Q 3/00; H04L 65/4069
See application file for complete search history.

(56) References Cited

U.S. PATENT DOCUMENTS 5,335,010 A * 8/1994 Lindemeier .......... H04B 7/0811
 343/876
5,818,543 A * 10/1998 Lee ...................... H04B 7/0814
 348/725

(Continued)

FOREIGN PATENT DOCUMENTS

WO 2009156366 A1 12/2009
WO 2011087905 A1 7/2011

OTHER PUBLICATIONS

Non-Final Office Action in U.S. Appl. No. 15/686,934, dated Jan. 25, 2019, 8 pages.
(Continued)

*Primary Examiner* — Brian P Yenke
(74) *Attorney, Agent, or Firm* — Rory D. Rankin; Kowert, Hood, Munyon, Rankin & Goetzel, P.C

(57) ABSTRACT

Systems, apparatuses, and methods for scheduling beamforming training during vertical blanking intervals (VBIs) are disclosed. A system includes a transmitter sending a video stream over a wireless link to a receiver. The wireless link between the transmitter and the receiver has capacity characteristics that fluctuate with variations in the environment. To combat the fluctuating capacity characteristics of the link, the transmitter and the receiver perform periodic beamforming training procedures to determine whether to adjust the beamforming characteristics of their respective antennas. To avoid interfering with the video data being sent, the system waits until a VBI to perform a beamforming training procedure. If the beamforming training procedure cannot be completed in a single VBI, then multiple VBIs can be used for performing separate portions of the beamforming training procedure. In one embodiment, the system can perform a beamforming training procedure every N VBIs, where N is a positive integer.

20 Claims, 7 Drawing Sheets

(51) Int. Cl.
*H01Q 3/00* (2006.01)
*H04B 7/06* (2006.01)
*H04W 72/12* (2009.01)
*H04W 72/04* (2009.01)

(52) U.S. Cl.
CPC ............ *H04L 65/80* (2013.01); *H04B 7/0617* (2013.01); *H04W 72/046* (2013.01); *H04W 72/0446* (2013.01); *H04W 72/1231* (2013.01)

(56) References Cited

U.S. PATENT DOCUMENTS

| | | | |
|---|---|---|---|
| 5,860,056 A * | 1/1999 | Pond | H01Q 1/1257 342/359 |
| 6,414,960 B1 * | 7/2002 | Kuhn | H04N 7/088 348/181 |
| 7,479,981 B2 * | 1/2009 | Tierney | H04N 17/04 348/184 |
| 7,596,359 B2 * | 9/2009 | Kimoto | A61B 1/00016 348/55 |
| 7,715,634 B2 * | 5/2010 | Lei | G10L 25/48 348/571 |
| 7,881,258 B2 * | 2/2011 | Gilbert | H04L 45/24 370/329 |
| 8,300,563 B2 | 10/2012 | Krishnaswamy et al. | |
| 8,365,238 B2 * | 1/2013 | Reznic | H04N 7/088 725/136 |
| 8,422,961 B2 * | 4/2013 | Kafle | H01Q 3/26 342/368 |
| 8,457,026 B1 | 6/2013 | Ho et al. | |
| 8,976,220 B2 | 3/2015 | Maxwell | |
| 9,450,620 B1 | 9/2016 | Ahmed et al. | |
| 9,716,537 B2 | 7/2017 | Mammoser et al. | |
| 9,786,985 B2 * | 10/2017 | Kim | H01Q 3/00 |
| 9,799,954 B2 | 10/2017 | Preradovic et al. | |
| 9,948,413 B1 | 4/2018 | Zhou et al. | |
| 10,312,980 B2 * | 6/2019 | Maamari | H04B 7/0452 |
| 10,523,295 B2 * | 12/2019 | Kasher | H04B 7/0469 |
| 10,582,458 B2 * | 3/2020 | Sadek | H04W 52/367 |
| 10,680,927 B2 * | 6/2020 | Vu | H04W 28/0231 |
| 10,871,559 B2 * | 12/2020 | Vu | H04N 7/20 |
| 10,959,111 B2 * | 3/2021 | Stark, Jr. | H04W 24/02 |
| 2003/0072376 A1 | 4/2003 | Krishnamachari et al. | |
| 2004/0081238 A1 | 4/2004 | Parhy | |
| 2004/0196919 A1 | 10/2004 | Mehta et al. | |
| 2004/0204103 A1 * | 10/2004 | Rouphael | H04B 7/0634 455/562.1 |
| 2005/0185097 A1 * | 8/2005 | Takatori | H04B 7/0808 348/570 |
| 2006/0017843 A1 | 1/2006 | Shi et al. | |
| 2006/0209890 A1 * | 9/2006 | MacMullan | H04L 63/0428 370/468 |
| 2006/0209892 A1 * | 9/2006 | MacMullan | H04W 12/08 370/468 |
| 2006/0212911 A1 * | 9/2006 | MacMullan | H04N 5/38 725/81 |
| 2006/0262985 A1 | 11/2006 | Chen et al. | |
| 2007/0147492 A1 | 6/2007 | Marquant et al. | |
| 2007/0223380 A1 * | 9/2007 | Gilbert | H04L 45/24 370/235 |
| 2008/0064425 A1 | 3/2008 | Kim et al. | |
| 2008/0088635 A1 * | 4/2008 | Callway | H04N 5/14 345/522 |
| 2008/0144713 A1 | 6/2008 | Kimmich et al. | |
| 2009/0150943 A1 | 6/2009 | Vasudevan et al. | |
| 2009/0213940 A1 | 8/2009 | Steinbach et al. | |
| 2010/0009635 A1 * | 1/2010 | Qin | H01Q 3/267 455/63.4 |
| 2010/0150252 A1 | 6/2010 | Camp, Jr. et al. | |
| 2010/0214169 A1 * | 8/2010 | Kafle | H01Q 3/26 342/368 |
| 2011/0058104 A1 * | 3/2011 | Aral | G06T 3/40 348/571 |
| 2011/0070928 A1 * | 3/2011 | Hsu | H04W 52/0216 455/574 |
| 2011/0129025 A1 | 6/2011 | Jaeckel et al. | |
| 2011/0151790 A1 * | 6/2011 | Khandekar | H04L 5/0062 455/63.1 |
| 2011/0286545 A1 | 11/2011 | Guignard et al. | |
| 2012/0276896 A1 | 11/2012 | Ren et al. | |
| 2012/0327115 A1 * | 12/2012 | Chhetri | H04R 3/005 345/633 |
| 2013/0115887 A1 * | 5/2013 | Kwon | H04B 7/0408 455/63.4 |
| 2013/0194950 A1 * | 8/2013 | Haghighat | H04L 5/0073 370/252 |
| 2013/0242117 A1 * | 9/2013 | Luo | H04N 21/43615 348/181 |
| 2014/0010319 A1 * | 1/2014 | Baik | H04B 7/0413 375/267 |
| 2014/0126620 A1 * | 5/2014 | Maltsev | H04B 7/0695 375/227 |
| 2014/0266900 A1 * | 9/2014 | Kasher | H04B 7/0617 342/372 |
| 2014/0269937 A1 | 9/2014 | Wadsworth et al. | |
| 2014/0368667 A1 * | 12/2014 | Peterson | H04L 7/10 348/187 |
| 2015/0110167 A1 | 4/2015 | Chen et al. | |
| 2015/0289147 A1 * | 10/2015 | Lou | H04B 7/0408 370/329 |
| 2015/0333994 A1 | 11/2015 | Gell et al. | |
| 2015/0341646 A1 | 11/2015 | Sze et al. | |
| 2016/0105229 A1 * | 4/2016 | Trainin | H04B 7/0617 370/329 |
| 2016/0134485 A1 | 5/2016 | Thapliya et al. | |
| 2016/0149633 A1 * | 5/2016 | Sanderovich | G01S 5/0289 375/267 |
| 2016/0227229 A1 | 8/2016 | Wadsworth | |
| 2016/0227432 A1 | 8/2016 | Freeman et al. | |
| 2016/0301770 A1 | 10/2016 | Marra et al. | |
| 2016/0337150 A1 | 11/2016 | Larsson et al. | |
| 2017/0026263 A1 | 1/2017 | Gell et al. | |
| 2017/0127408 A1 | 5/2017 | Du | |
| 2017/0134076 A1 * | 5/2017 | Maamari | H04B 7/0452 |
| 2017/0141885 A1 | 5/2017 | Bontu et al. | |
| 2017/0156067 A1 * | 6/2017 | Huang | H04W 16/28 |
| 2017/0187437 A1 | 6/2017 | Cariou et al. | |
| 2017/0207839 A1 * | 7/2017 | Eitan | H04B 7/0617 |
| 2017/0222704 A1 * | 8/2017 | Eitan | H04B 7/0478 |
| 2017/0251484 A1 * | 8/2017 | Negus | H04W 72/082 |
| 2017/0264350 A1 * | 9/2017 | Sanderovich | H04B 7/0491 |
| 2018/0027420 A1 * | 1/2018 | Takahashi | H04W 76/14 370/329 |
| 2018/0062719 A1 * | 3/2018 | Verma | H04B 7/0617 |
| 2018/0074188 A1 * | 3/2018 | Polo | G01S 5/00 |
| 2018/0093177 A1 | 4/2018 | Tokubo | |
| 2018/0123901 A1 | 5/2018 | Yermakov et al. | |
| 2018/0137412 A1 | 5/2018 | Nikkhah et al. | |
| 2018/0198506 A1 * | 7/2018 | Sanderovich | H04B 7/0695 |
| 2018/0199256 A1 | 7/2018 | Sanderovich et al. | |
| 2018/0205423 A1 * | 7/2018 | Sanderovich | H04B 7/063 |
| 2018/0227027 A1 | 8/2018 | Trainin | H04B 7/0695 |
| 2018/0234860 A1 * | 8/2018 | Kasher | H04B 7/0695 |
| 2018/0248603 A1 * | 8/2018 | Kasher | H04B 7/0621 |
| 2018/0288635 A1 | 10/2018 | Kaushik et al. | |
| 2019/0036572 A1 * | 1/2019 | Kasher | H04B 7/0408 |
| 2019/0068473 A1 * | 2/2019 | Vu | H04L 43/0882 |
| 2019/0101638 A1 * | 4/2019 | Vu | G01S 13/89 |
| 2019/0104276 A1 * | 4/2019 | Vu | H04N 5/40 |
| 2019/0104458 A1 | 4/2019 | Svennebring et al. | |
| 2019/0158156 A1 * | 5/2019 | Da Silva | H04B 7/0421 |
| 2019/0173544 A1 | 6/2019 | Vu et al. | |
| 2019/0199467 A1 * | 6/2019 | Vu | H04L 1/0003 |
| 2019/0215256 A1 | 7/2019 | Dhanabalan et al. | |
| 2019/0230185 A1 | 7/2019 | Dhanabalan et al. | |
| 2019/0261209 A1 | 8/2019 | Balasubramanian et al. | |

(56) References Cited

U.S. PATENT DOCUMENTS

2019/0364449 A1* 11/2019 Yang ................ H04W 72/0446
2020/0280862 A1* 9/2020 Stark, Jr. .............. H04W 24/08

OTHER PUBLICATIONS

Non-Final Office Action in U.S. Appl. No. 15/832,448, dated Feb. 1, 2019, 15 pages.
International Search Report and Written Opinion in International Application No. PCT/US2018/052350, dated Dec. 14, 2018, 13 pages.
Van Der Schaar et al., "Robust Transmission of MPEG-4 Scalable Video Over 4G Wireless Networks", International Conference on Image Processing, Sep. 22, 2002, pp. 757-760, vol. 3, IEEE.
International Search Report and Written Opinion in International Application No. PCT/US2018/052373, dated Jan. 7, 2019, 13 pages.
Vu, Ngoc Vinh, U.S. Appl. No. 15/852,833, entitled "Video Codec Data Recovery Techniques for Lossy Wireless Links", filed Dec. 22, 2017, 36 pages.
Non-Final Office Action in U.S. Appl. No. 15/721,125, dated Feb. 20, 2019, 9 pages.
Non-Final Office Action in U.S. Appl. No. 15/852,833, dated May 31, 2019, 11 pages.
Final Office Action in U.S. Appl. No. 15/721,125, dated Sep. 10, 2019, 9 pages.
Final Office Action in U.S. Appl. No. 15/832,448, dated Sep. 30, 2019, 18 pages.
Final Office Action in U.S. Appl. No. 15/852,833, dated Oct. 3, 2019, 12 pages.
Final Office Action in U.S. Appl. No. 15/686,934, dated Oct. 16, 2019, 9 pages.
Final Office Action in U.S. Appl. No. 15/832,448, dated Oct. 28, 2020, 19 pages.
Non-Final Office Action in U.S. Appl. No. 15/832,448, dated Apr. 15, 2020, 18 pages.
Non-Final Office Action in U.S. Appl. No. 15/852,833, dated Apr. 17, 2020, 12 pages.
Non-Final Office Action in U.S. Appl. No. 15/721,125, dated Jan. 7, 2020, 10 pages.
Non-Final Office Action in U.S. Appl. No. 15/721,125, dated Mar. 11, 2021, 11 pages.

* cited by examiner

CUSTOM BEAMFORMING DURING A VERTICAL BLANKING INTERVAL

BACKGROUND

Description of the Related Art

A wireless communication link can be used to send a video stream from a computer (or other device) to a virtual reality (VR) headset (or head mounted display (HMD). Transmitting the VR video stream wirelessly eliminates the need for a cable connection between the computer and the user wearing the HMD, thus allowing for unrestricted movement by the user. A traditional cable connection between a computer and HMD typically includes one or more data cables and one or more power cables. Allowing the user to move around without a cable tether and without having to be cognizant of avoiding the cable creates a more immersive VR system. Sending the VR video stream wirelessly also allows the VR system to be utilized in a wider range of applications than previously possible.

However, a VR application is a low latency application and typically only buffers a small amount of video data. For example, when the user moves their head, this is detected by the HMD or console, and then the subsequently rendered video frames are updated to reflect the new viewing position of the user. Additionally, changing conditions of the link can affect video quality. When the link deteriorates and video data is lost or corrupted, this can result in a poor user viewing experience. Accordingly, improved techniques for wireless streaming of data are desired.

BRIEF DESCRIPTION OF THE DRAWINGS

The advantages of the methods and mechanisms described herein may be better understood by referring to the following description in conjunction with the accompanying drawings, in which.

DETAILED DESCRIPTION OF EMBODIMENTS

Figure 1:
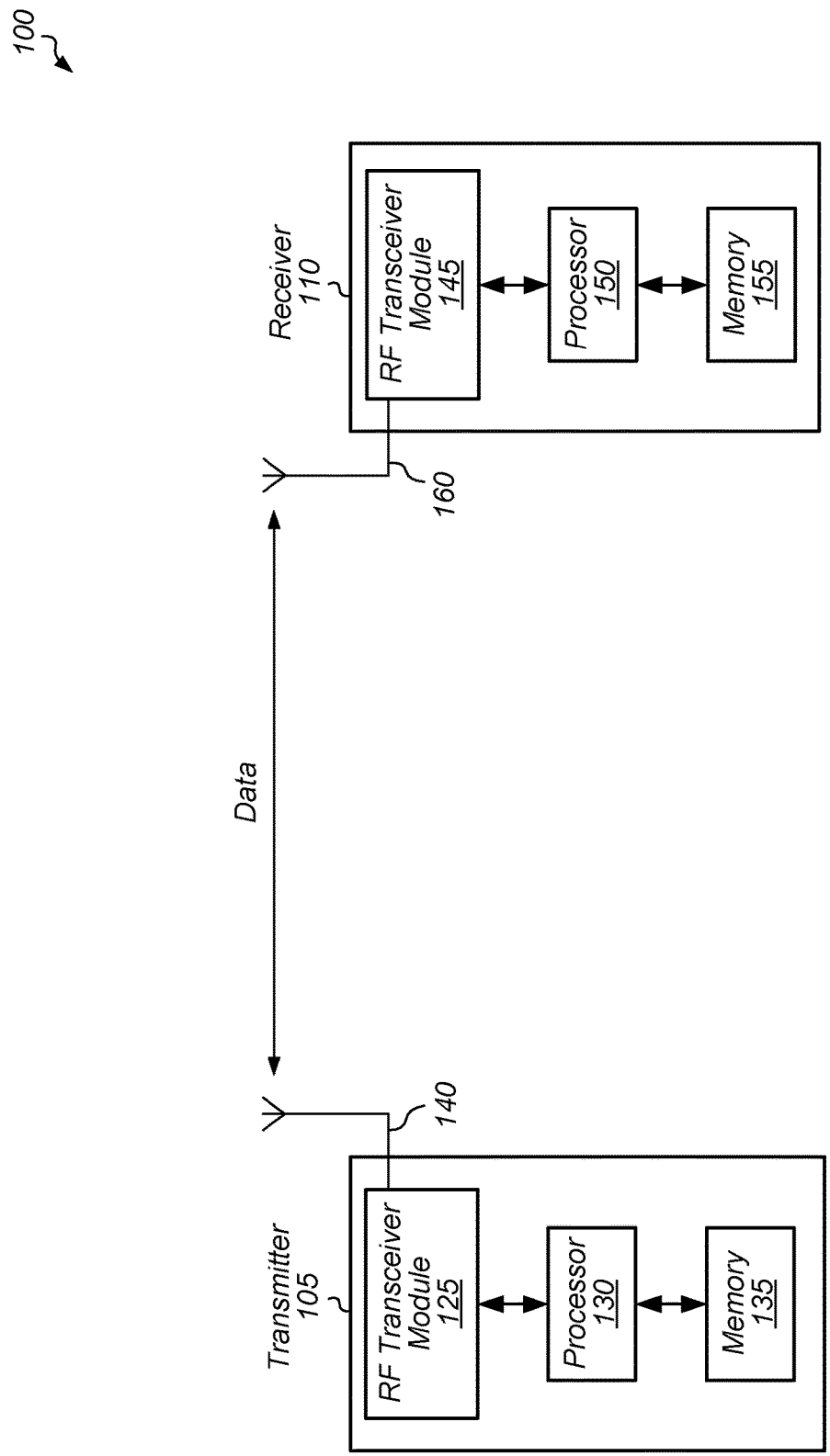
FIG. 1 is a block diagram of one embodiment of a system.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

Various systems, apparatuses, methods, and computer-readable mediums for scheduling and performing beamforming training procedures in vertical blanking intervals (VBIs) are disclosed herein. In one embodiment, a wireless communication system includes a transmitter and a receiver communicating over a wireless link. In one embodiment, the transmitter is configured to encode a video stream and wirelessly transmit the encoded video stream to the receiver. In one embodiment, the video stream is part of a virtual reality (VR) rendered environment.

In one embodiment, the receiver is configured to display frames of the video stream on the receiver in accordance with a periodic time sequence, where a period of each frame includes a vertical blanking interval (VBI). In one embodiment, the transmitter and receiver schedule a beamforming training procedure for antenna beam alignment to be performed during a VBI at the end of a given video frame being displayed. In one embodiment, the transmitter and the receiver are configured to schedule beamforming training procedures once every N VBI's, wherein N is a positive integer. In some applications, when video data is sent wirelessly, the video data is sent at a high bandwidth, and there is no airtime available to search for the best beam while the video data is being sent. Accordingly, performing a beamforming training procedure in a VBI prevents the beamforming from interfering with the transfer of video data.

In one embodiment, the transmitter is configured to send to the receiver a first frame of a video stream in a first frame period. Next, the receiver displays the first frame of the video stream. Then, the transmitter and the receiver implement a first beamforming training procedure in a first VBI at the end of the first frame period. The transmitter and/or receiver can update the antenna sectors and/or beams which are used for subsequent transmissions as a result of the beamforming training procedure. After performing the beamforming training procedure, the transmitter sends to the receiver a second frame of a video stream in a second frame period. It is assumed for the purposes of this discussion that the first and second frame periods are consecutive frame periods for displaying consecutive frames of the video stream. Next, the receiver displays the second frame of the video stream. Then, the transmitter and the receiver implement a second beamforming training procedure in a second VBI at the end of the second frame period. This pattern of sending frame data and then performing beamforming training procedures in the VBIs at the end of the frames can continue for subsequent frames of the video sequence. In one embodiment, the transmitter utilizes a first antenna sector to send the first frame of the video stream to the receiver in the first frame period, and the transmitter utilizes a second antenna sector to send the second frame of the video stream to the receiver in the second frame period.

In one embodiment, a full beamforming training procedure might not fit into a single VBI. In this embodiment, a first portion of a first beamforming training procedure is performed in a first VBI. Then, a second portion of the first beamforming training procedure is performed in a second VBI, wherein the second VBI is immediately subsequent to the first VBI. In other embodiments, a full beamforming training procedure can be split into other numbers of portions to be performed in other numbers of VBIs.

In one embodiment, an impairment is detected in the link between the transmitter and the receiver. The transmitter or the receiver schedules a beamforming training procedure to occur during a next VBI in response to detecting the impairment of the link. If the transmitter detects the impairment of the link, then the transmitter sends an indication to the receiver that beamforming training will begin at a next VBI. Alternatively, if the receiver detects the impairment of the link, then the receiver sends an indication to the transmitter that beamforming training will begin at a next VBI.

Referring now to FIG. 1, a block diagram of one embodiment of a system 100 is shown. System 100 includes at least a first communications device (e.g., transmitter 105) and a second communications device (e.g., receiver 110) operable to communicate with each other wirelessly. It is noted that transmitter 105 and receiver 110 can also be referred to as transceivers. In one embodiment, transmitter 105 and receiver 110 communicate wirelessly over the unlicensed 60 Gigahertz (GHz) frequency band. For example, transmitter 105 and receiver 110 can communicate in accordance with the Institute of Electrical and Electronics Engineers (IEEE) 802.11ad standard (i.e., WiGig). In other embodiments, transmitter 105 and receiver 110 can communicate wirelessly over other frequency bands and/or by complying with other wireless communication standards.

Wireless communication devices that operate within extremely high frequency (EHF) bands, such as the 60 GHz frequency band, are able to transmit and receive signals using relatively small antennas. However, such signals are subject to high atmospheric attenuation when compared to transmissions over lower frequency bands. In order to reduce the impact of such attenuation and boost communication range, EHF devices typically incorporate beamforming technology. For example, the IEEE 802.11ad specification details a beamforming training procedure, also referred to as sector-level sweep (SLS), during which a wireless station tests and negotiates the best transmit and/or receive antenna combinations with a remote station. In some embodiments a negotiation protocol is established that enables a transmitter and receiver to choose a mutually-compatible beamforming method, access and control of a link, time slots for performing various activities, and so on. In various embodiments, transmitter 105 and receiver 110 are configured to perform periodic beamforming training procedures to determine the optimal transmit and receive antenna combinations for wireless data transmission.

In one embodiment, transmitter 105 and receiver 110 have directional transmission and reception capabilities, and the exchange of communications over the link utilizes directional transmission and reception. Each directional transmission is a transmission that is beamformed so as to be directed towards a selected transmit sector of antenna 140. Similarly, directional reception is performed using antenna settings optimized for receiving incoming transmissions from a selected receive sector of antenna 160. The link quality can vary depending on the transmit sectors selected for transmissions and the receive sectors selected for receptions. The transmit sectors and receive sectors which are selected are determined by system 100 performing a beamforming training procedure.

Transmitter 105 and receiver 110 are representative of any type of communication devices and/or computing devices. For example, in various embodiments, transmitter 105 and/or receiver 110 can be a mobile phone, tablet, computer, server, head-mounted display (HMD), television, another type of display, router, or other types of computing or communication devices. In one embodiment, system 100 executes a virtual reality (VR) application for wirelessly transmitting frames of a rendered virtual environment from transmitter 105 to receiver 110. In other embodiments, other types of applications can be implemented by system 100 that take advantage of the methods and mechanisms described herein.

In one embodiment, transmitter 105 includes at least radio frequency (RF) transceiver module 125, processor 130, memory 135, and antenna 140. RF transceiver module 125 is configured to transmit and receive RF signals. In one embodiment, RF transceiver module 125 is a mm-wave transceiver module operable to wirelessly transmit and receive signals over one or more channels in the 60 GHz band. RF transceiver module 125 converts baseband signals into RF signals for wireless transmission, and RF transceiver module 125 converts RF signals into baseband signals for the extraction of data by transmitter 105. It is noted that RF transceiver module 125 is shown as a single unit for illustrative purposes. It should be understood that RF transceiver module 125 can be implemented with any number of different units (e.g., chips) depending on the embodiment. Similarly, processor 130 and memory 135 are representative of any number and type of processors and memory devices, respectively, that can be implemented as part of transmitter 105.

Transmitter 105 also includes antenna 140 for transmitting and receiving RF signals. Antenna 140 represents one or more antennas, such as a phased array, a single element antenna, a set of switched beam antennas, etc., that can be configured to change the directionality of the transmission and reception of radio signals. As an example, antenna 140 includes one or more antenna arrays, where the amplitude or phase for each antenna within an antenna array can be configured independently of other antennas within the array. Although antenna 140 is shown as being external to transmitter 105, it should be understood that antenna 140 can be included internally within transmitter 105 in various embodiments. Additionally, it should be understood that transmitter 105 can also include any number of other components which are not shown to avoid obscuring the figure. Similar to transmitter 105, the components implemented within receiver 110 include at least RF transceiver module 145, processor 150, memory 155, and antenna 160, which are analogous to the components described above for transmitter 105. It should be understood that receiver 110 can also include or be coupled to other components (e.g., a display).

In one embodiment, transmitter 105 is configured to send data packets using a selected transmit sector to receiver 110 which receives the data packets on a selected receive sector. In various embodiments, the link between transmitter 105 and receiver 110 has capacity characteristics that fluctuate with variations in the environment. To combat the fluctuating capacity characteristics of the link, transmitter 105 and receiver 110 are configured to perform periodic beamforming training procedures to optimize the beamforming characteristics of their respective antennas. However, in one embodiment, transmitter 105 is configured to transmit video data wirelessly to receiver 110, and performing the periodic beamforming training procedures can interfere with the video data being transmitted. Accordingly, to avoid interfering with the transmission of video data, transmitter 105 and receiver 110 are configured to schedule beamforming training procedures during vertical blanking intervals (VBIs) of the video frame periods for the video sequence being transmitted and displayed. As used herein, the term "vertical blanking interval" is defined as the period of time between the last line or pixel of a video frame being transmitted or displayed and the first line or pixel of the subsequent video frame being transmitted or displayed.

The frequency with which beamforming training procedures are performed can vary based on multiple factors. In one embodiment, beamforming training procedures are performed on a periodic basis. For example, beamforming training procedures can be performed every Nth VBI, where N is a positive integer. In some cases, the frequency with which beamforming training procedures are performed can be adjusted based on different factors. For example, the frequency of beamforming training procedures can be adjusted based on power savings requirements. In another embodiment, the frequency of beamforming training procedures can be adjusted based on hints provided by the user application. For example, if system 100 is executing a VR video game application, during certain sequences of the video game, significant user movement can be expected. The application can generate a hint or change a setting which can cause the frequency of beamforming training procedures to be increased during these sequences. During other sequences, when the user is expected or predicted to be relatively sedentary, the frequency of beamforming training procedures can be reduced. Additionally, in other embodiments, other factors can also affect the frequency with which beamforming training procedures are performed.

In some embodiments, transmitter 105 and receiver 110 might not be able to perform an entire beamforming training procedure in a single VBI. In these embodiments, transmitter 105 and receiver 110 can utilize various techniques for partitioning a beamforming training procedure into multiple mini-procedures. In one embodiment, a first portion of the beamforming training procedure can be performed in a first VBI, a second portion of the beamforming training procedure can be performed in a first VBI, and so on. For example, a sector level sweep process can be performed in a first VBI and then a beam refinement protocol process can be performed in a second VBI. In another embodiment, a partial sector level sweep process can be performed in a VBI. For example, only a subset of the antenna sectors are tested in a partial sector level sweep process.

In some embodiments, a beamforming training procedure, or a mini-procedure (i.e., some portion of a full beamforming training procedure), is performed in response to detecting an impairment of the link. For example, if transmitter 105 or receiver 110 detects a loss of data or other condition indicative of an impairment of the link, then transmitter or receiver 110 can schedule a beamforming training procedure for the next VBI. After this beamforming training procedure, beamforming training procedures can go back to being performed on their regular schedule.

In one embodiment, system 100 operates in different modes, with each mode utilizing a different type of beamforming training procedure. For example, in a first beamforming mode, an exhaustive search of all antenna sectors is performed in a given training procedure to find the optimal sectors for communicating on the link. A second beamforming mode involves performing a reduced search of a subset of antenna sectors. For example, only the nearby sectors (nearby to the current optimal sector) and optionally a few randomly selected sectors are tested during the second beamforming mode. A training procedure for the first beamforming mode will take longer than a training procedure for the second beamforming mode, and so transmitter 105 or receiver 110 can determine how to schedule training procedures in the different modes depending on how much time is available for a beamforming training procedure. In one embodiment, if an impairment is detected in the link, transmitter 105 and receiver 110 can schedule a second beamforming mode training procedure for the next VBI. However, if the link quality remains above a threshold, then transmitter 105 and receiver 110 can wait for the next regularly scheduled training procedure of the first beamforming mode. In other embodiments, other types and numbers of beamforming modes can be utilized and with transmitter 105 and receiver 110 utilizing other scheduling techniques to schedule beamforming training procedures for the different types of modes.

Figure 2:
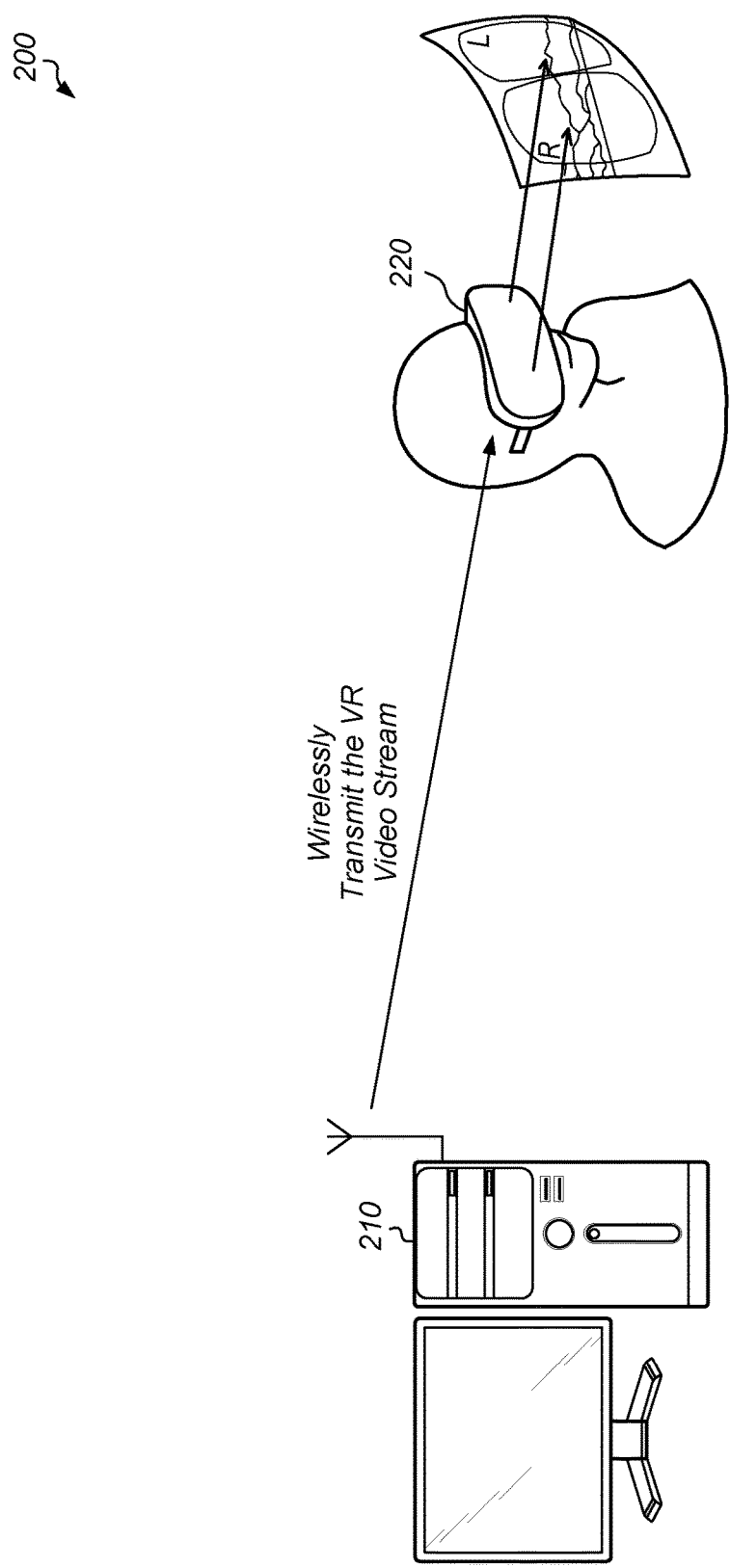
FIG. 2 is a block diagram of one embodiment of a wireless virtual reality (VR) system.

Turning now to FIG. 2, a block diagram of one embodiment of a wireless virtual reality (VR) system 200 is shown. System 200 includes at least computer 210 and head-mounted display (HMD) 220. Computer 210 is representative of any type of computing device which includes one or more processors, memory devices, input/output (I/O) devices, RF components, antennas, and other components indicative of a personal computer or other computing device. In other embodiments, other computing devices, besides a personal computer, can be utilized to send video data wirelessly to head-mounted display (HMD) 220. For example, computer 210 can be a gaming console, smart phone, set top box, television set, video streaming device, wearable device, a component of a theme park amusement ride, or otherwise.

Computer 210 and HMD 220 each include circuitry and/or components to communicate wirelessly. It is noted that while computer 210 is shown as having an external antenna, this is shown merely to illustrate that the video data is being sent wirelessly. It should be understood that computer 210 can have an antenna which is internal to the external case of computer 210. Additionally, while computer 210 can be powered using a wired power connection, HMD 220 is typically battery powered. Alternatively, computer 210 can be a laptop computer powered by a battery.

In one embodiment, computer 210 includes circuitry configured to dynamically render a representation of a VR environment to be presented to a user wearing HMD 220. For example, in one embodiment, computer 210 includes one or more graphics processing units (GPUs) to render a VR environment. In other embodiments, computer 210 can include other types of processors, including a central processing unit (CPU), application specific integrated circuit (ASIC), field programmable gate array (FPGA), digital signal processor (DSP), or other processor types. HMD 220 includes circuitry to receive and decode a compressed bit stream sent by computer 210 to generate frames of the rendered VR environment. HMD 220 then drives the generated frames to the display integrated within HMD 220.

After rendering a frame of a virtual environment video stream, computer 210 encodes (i.e., compresses) the rendered frame and then sends the encoded frame wirelessly to HMD 220. In one embodiment, computer 210 is configured to select the optimal transmit sector for transmitting the encoded frame wirelessly to HMD 220. Also, in this embodiment, HMD 220 is configured to select the optimal receive sector for receiving the encoded frame sent by computer. Computer 210 and HMD 220 perform beamforming training procedures periodically to update the selected antenna sectors. For example, as the position of HMD 220 changes with respect to computer 210, the antenna sectors which will optimize the transmission of RF signals can change. Additionally, other factors can affect the quality of the link between computer 210 and HMD 220, such as the proximity of walls or other objects to each device, the presence of any obstacles directly in between the devices, and/or other factors.

Rather than performing these beamforming training procedures according to a schedule based on a beacon transmission interval which is not aligned with the video frame sequence, computer 210 and HMD 220 are configured to schedule beamforming training procedures to be performed during VBIs of the video frame sequence. This prevents the beamforming training procedures from interfering with the transfer of video data during the active portions of the video frame periods.

Figure 3:
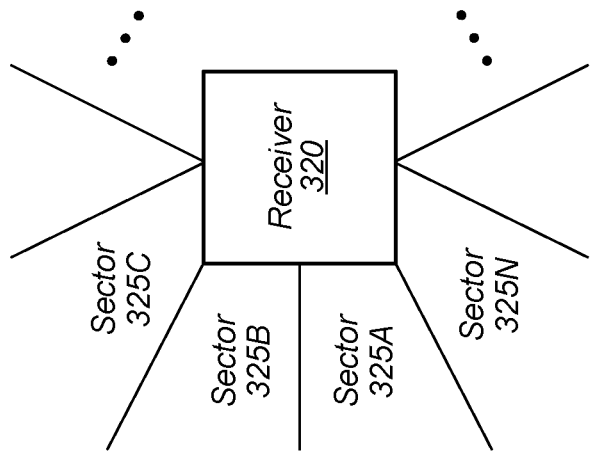
FIG. 3 is a diagram of one embodiment of transmit and receive beamforming sectors.
Figure 3:
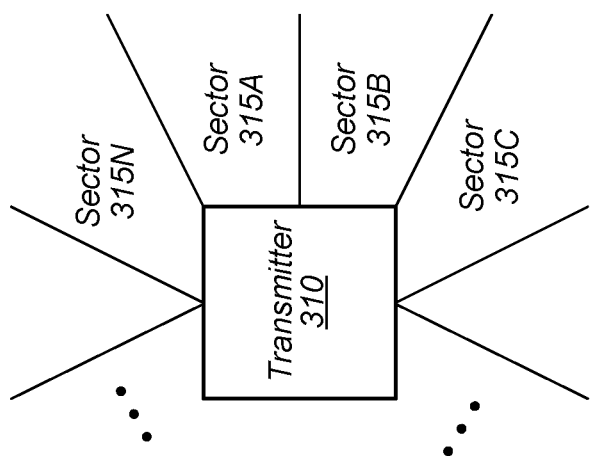

Referring now to FIG. 3, a diagram depicting transmit and receive beamforming sectors is shown. In one embodiment, transmitter 310 is configured to perform each of its directional transmissions towards a respective transmit sector selected from among a plurality of transmit sectors 315A-N. Transmit sectors 315A-N are representative of any number of transmit sectors, with the number varying from embodiment to embodiment. Receiver 320 is configured to perform each of its directional receptions from a respective receive sector selected from among a plurality of receive sectors 325A-N, which are representative of any number of receive sectors.

When communicating with receiver 320, transceiver 310 directionally transmits RF signals toward a selected one of transmit sectors 315A-N. If transceiver 310 transmits signals toward transmit sectors in a direction away from receiver 320, the energy levels of signals received by receiver 320 will be low, preventing receiver 320 from successfully receiving the signals. Otherwise, if transmitter 310 transmits signals to a transmit sector oriented toward receiver 320, signals will arrive at receiver 320 with high levels of energy. For example, if receiver 320 is monitoring receive sector 325A or 325B for incoming transmissions at the same time that a signal arrives from transmitter 310 with high levels of energy, receiver 320 will receive the signal with a high level of power, enabling receiver 320 to successfully extract the data from the signal.

During beamforming training, transmitter 310 and receiver 320 each cycle through the different sectors to determine the best configuration for transmitting data from transmitter 310 to receiver 320. If one or both of transmitter 310 and receiver 320 are mobile, then the best sectors for transmitting data can change over time. Accordingly, transmitter 310 and receiver 320 can repeat the beamforming training procedure at periodic intervals to determine if an alternate configuration would result in a better connection.

Transmitter 310 and receiver 320 are configured to reinitiate the beamforming training procedure periodically in order to determine whether link quality can be improved by using different beamforming parameters. In one embodiment, transmitter 310 and receiver 320 determine whether to initiate a beamforming training procedure based on a signal-to-noise ratio (SNR) measurement of a received signal over beamformed links, based on a packet reception rate, and/or based on other factors. For example, if the SNR of the received signal is less than a threshold, then transmitter 310 and receiver 320 can schedule and perform a beamforming training procedure in the next VBI. Alternatively, if the packet reception rate falls below a threshold, transmitter 310 and receiver 320 can schedule and perform a beamforming training procedure in the next VBI. In other embodiments, transmitter 310 and receiver 320 perform a beamforming training procedure on a fixed schedule (i.e., every Nth VBI).

Figure 4:
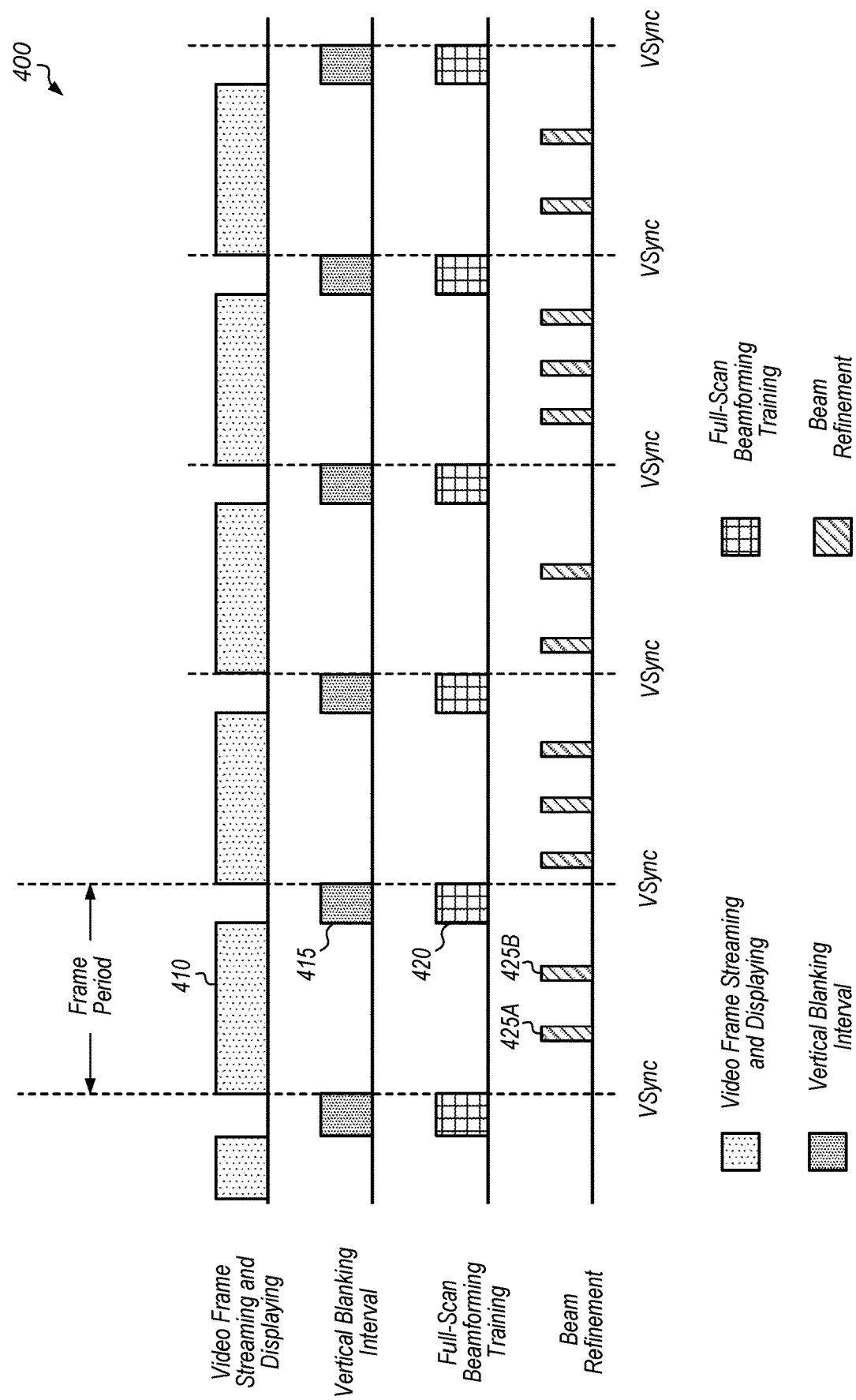
FIG. 4 is a timing diagram of one embodiment depicting the timing of different intervals in relation to a frame period.

Turning now to FIG. 4, a timing diagram 400 depicting the timing of different intervals in relation to a frame period is shown. The timing of various events over multiple frame periods is shown in timing diagram 400. It is assumed for the purposes of this discussion that a video stream is being transmitted wirelessly from a transmitter to a receiver and then the video stream is being displayed on the receiver. The period of time 410 when a single video frame is being transmitted and displayed is shown in the first full frame period of timing diagram 400. The timing of events occurring over multiple frame periods are shown in timing diagram 400. The duration of a frame period can vary from embodiment to embodiment. In one embodiment, the frame period is 11 milliseconds (ms). In other embodiments, the frame period can be other durations.

To avoid interfering with the video stream being transmitted, full-scan beamforming training 420 can be performed so that it occurs in the vertical blanking interval (VBI) 415 as shown for the first full frame period. Full-scan beamforming training can also be performed in the VBIs of subsequent frame periods. Although full-scan beamforming training is shown as being performed in the VBI of every frame in timing diagram 400, this does not mean full-scan beamforming training needs to occur in every frame, only that full-scan beamforming training can occur once per frame during the VBI. In one embodiment, full-scan beamforming training is performed every Nth frame, where N is a positive integer. In another embodiment, full-scan beamforming training can be performed in response to detecting an impairment in the link. When an impairment is detected in the link, then full-scan beamforming training can be scheduled for the next VBI.

In addition to full-scan beamforming training sessions, lighter beamforming training can be performed to track the beam while a video frame is being displayed. This lighter beamforming training is shown as beam refinement intervals 425A and 425B. Beam refinement can occur multiple times during the frame. The frequency with which beam refinement is performed can vary according to the embodiment.

Figure 5:
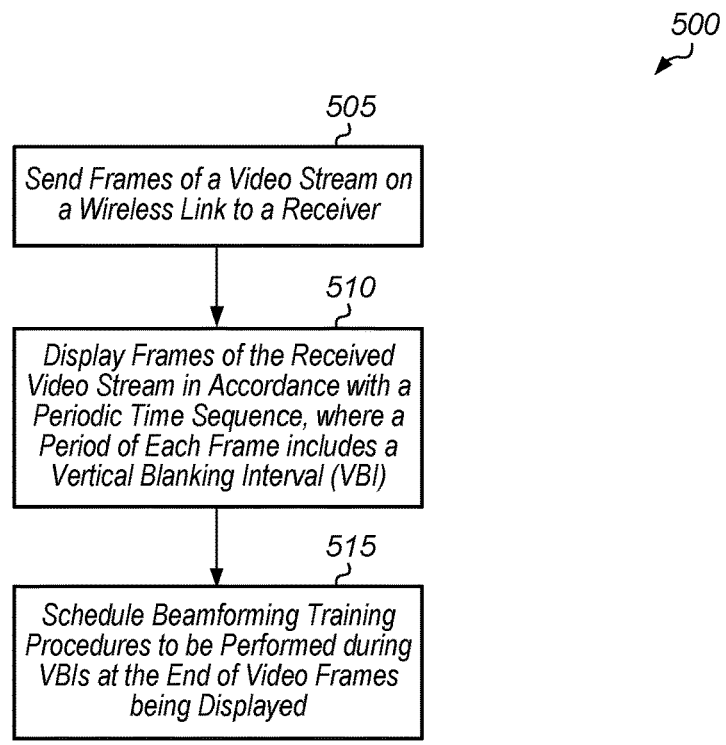
FIG. 5 is a generalized flow diagram illustrating one embodiment of a method for scheduling beamforming training in VBIs.
Figure 6:
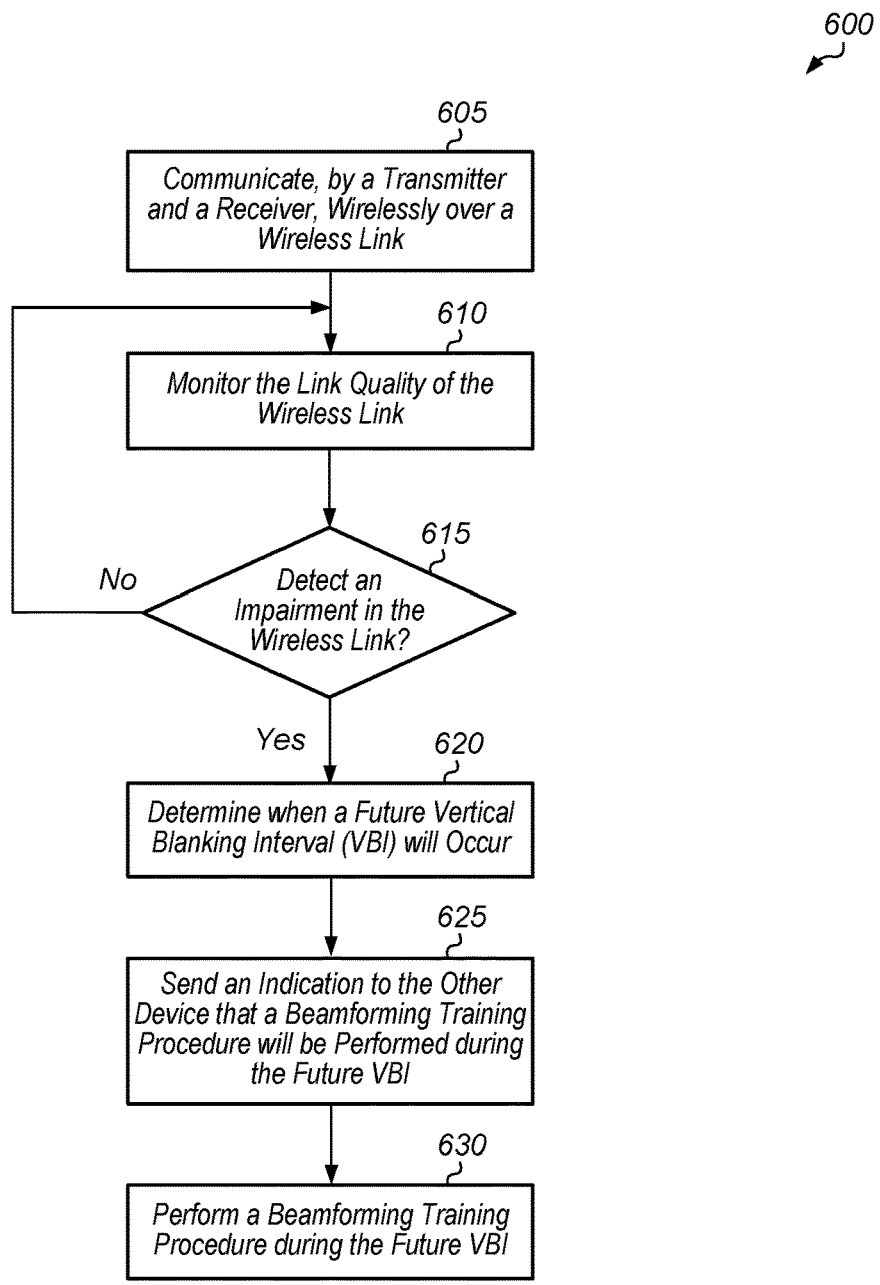
FIG. 6 is a generalized flow diagram illustrating another embodiment of a method for performing beamforming training during VBIs.
Figure 7:
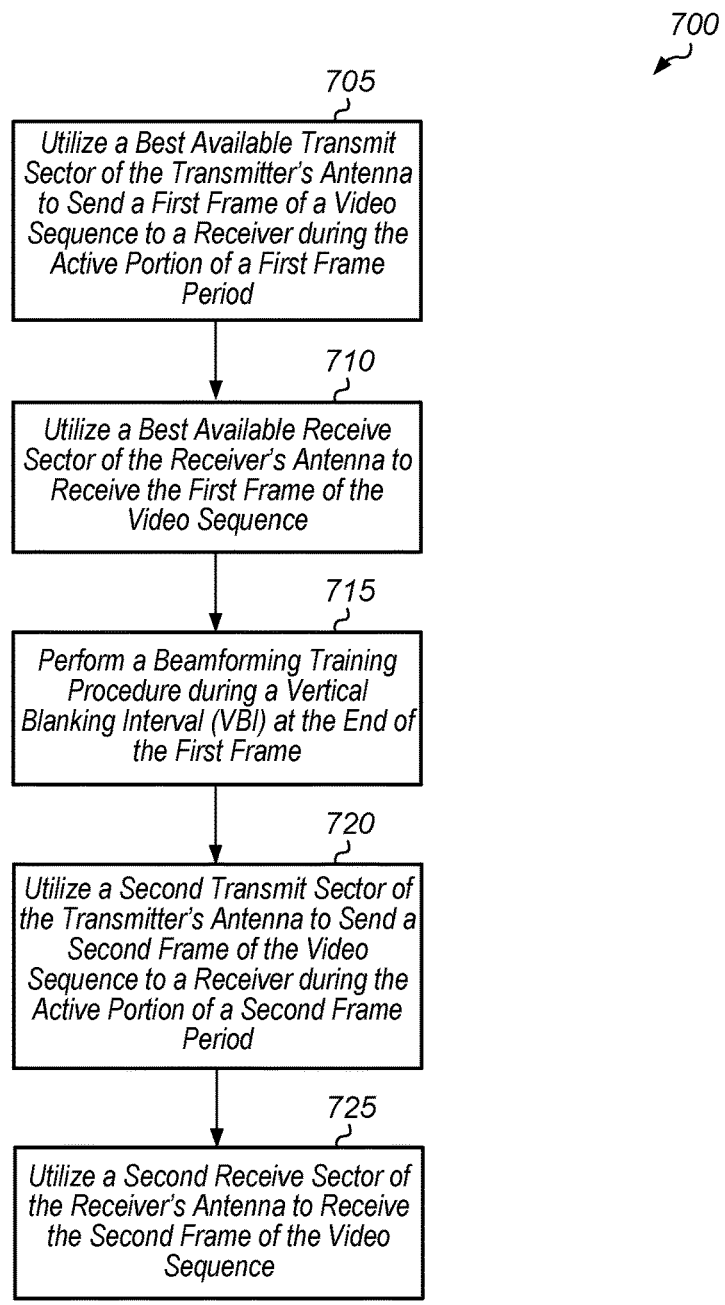
FIG. 7 is a generalized flow diagram illustrating one embodiment of a method for sending a video sequence from a transmitter to a receiver.

Referring now to FIG. 5, one embodiment of a method 500 for scheduling beamforming for VBIs is shown. For purposes of discussion, the steps in this embodiment and those of FIG. 6-7 are shown in sequential order. However, it is noted that in various embodiments of the described methods, one or more of the elements described are performed concurrently, in a different order than shown, or are omitted entirely. Other additional elements are also performed as desired. Any of the various systems or apparatuses described herein are configured to implement method 500.

A transmitter sends frames of a video stream on a wireless link to a receiver (block 505). The transmitter and the receiver can be any types of computing devices, with the type of computing device varying according to the embodiment. In one embodiment, the transmitter sends a rendered video stream to the receiver as part of a virtual reality (VR) environment. In one embodiment, the transmitter is a computer and the receiver is a head-mounted display (HMD). In other embodiments, the transmitter and/or the receiver can be other types of computing devices and/or other types of data can be sent from the transmitter to the receiver.

The receiver displays frames of the received video stream in accordance with a periodic time sequence, where a period of each frame includes a vertical blanking interval (VBI) (block 510). For example, the receiver displays a single frame of the video stream each frame period, with the duration of the frame period varying according to the embodiment. The transmitter and receiver schedule beamforming training procedures to be performed during VBIs at the end of video frames being displayed (block 515). By scheduling beamforming training procedures to occur during VBIs, this avoids having beamforming training interfere with the sending of video data. After block 515, method 500 ends.

Turning now to FIG. 6, one embodiment of a method 600 for performing beamforming training during VBIs is shown. A transmitter and a receiver communicate wirelessly over a wireless link (block 605). The transmitter and the receiver monitor the link quality of the wireless link (block 610). If the transmitter or the receiver detects an impairment in the wireless link (conditional block 615, "yes" leg), then the transmitter and/or receiver determine when a future VBI will occur (block 620). In one embodiment, the future VBI is the next VBI. In other embodiments, the future VBI is some other VBI that is determinable and can be indicated. For example, the future VBI could be the $4^{th}$ next VBI, the sixth next VBI, or some other VBI. The transmitter or the receiver then sends an indication to the other device that a beamforming training procedure will be performed during the future VBI (block 625). In one embodiment, the indication is particular data or an encoding within a transmitted packet. For example, packets that are transmitted may include an indication as to what type of packet is being transmitted and/or what type of data is included in the packet. In addition, the packet may include an indication as to a future VBI or multiple VBIs over which training is to occur. In other embodiments, other indications can be utilized. In some embodiments, the indication can also specify if the beamforming training procedure is a full procedure or a mini-procedure. The indication can also specify what type of mini-procedure will be performed. When the future VBI occurs, the transmitter and the receiver perform a beamforming training procedure (block 630). During beamforming training procedure, the transmitter and receiver will discover the optimal antenna sectors to use for communicating on the link. The transmitter and the receiver can then use these optimal antenna sectors for subsequent communications. After block 630, method 600 ends.

Referring now to FIG. 7, one embodiment of a method 700 for sending a video sequence from a transmitter to a receiver is shown. A transmitter utilizes a best available transmit sector of the transmitter's antenna to send a first frame of a video sequence to a receiver during the active portion of a first frame period (block 705). The receiver utilizes a best available receive sector of the receiver's antenna to receive the first frame of the video sequence (block 710). Then, during a VBI at the end of the first frame period, the transmitter and the receiver perform a beamforming training procedure (block 715). A beamforming training procedure is performed for the transmitter and receiver to test and negotiate the best transmit and/or receive antenna combinations for communicating wirelessly with each other.

It is assumed for the purposes of this discussion that as a result of the beamforming training procedure, the transmitter determines that a second transmit sector (which may be different than the sector used in block 705 and 710) of the transmitter's antenna is the optimal sector for transmitting data to the receiver. It is also assumed for the purposes of this discussion that the receiver determines that a second receive sector of the receiver's antenna is the optimal sector for receiving data sent by the transmitter.

Next, the transmitter utilizes a second transmit sector of the transmitter's antenna to send a second frame of the video sequence to a receiver during an active portion of a second frame period (block 720). It is noted that the first and second frames are consecutive frames of the video sequence. The receiver uses a second receive sector of the receiver's antenna to receive the second frame of the video sequence (block 725). After block 725, method 700 ends.

In various embodiments, program instructions of a software application are used to implement the methods and/or mechanisms described herein. For example, program instructions executable by a general or special purpose processor are contemplated. In various embodiments, such program instructions may be represented by a high level programming language. In other embodiments, the program instructions may be compiled from a high level programming language to a binary, intermediate, or other form. Alternatively, program instructions may be written that describe the behavior or design of hardware. Such program instructions may be represented by a high-level programming language, such as C. Alternatively, a hardware design language (HDL) such as Verilog may be used. In various embodiments, program instructions are stored on any of a variety of non-transitory computer readable storage medium. The storage medium is accessible by a computing system during use to provide the program instructions to the computing system for program execution. Generally speaking, such a computing system includes at least one or more memories and one or more processors configured to execute program instructions.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A system comprising:
   transmitter circuitry configured to:
      send a video stream over a wireless link, wherein a video frame period of each frame, in accordance with a periodic time sequence, includes both an active portion during which a single video frame is being transmitted and a vertical blanking interval (VBI);
      perform a full beamforming training procedure during a first VBI of a first video frame period, in response to determining that the full beamforming training procedure can be performed such that it occurs within a period of time corresponding to a single VBI; and
      perform a beam refinement protocol during an active portion of a second video frame period, where the beam refinement protocol includes a partial sector level sweep that is less than a full sector level sweep.

2. The system as recited in claim 1, wherein the beam refinement protocol process includes multiple partial sector level sweeps during the active portion of the second video frame period.

3. The system as recited in claim 1, wherein the circuitry of the transmitter is further configured to adjust a frequency with which beamforming training procedures are performed based at least in part on power savings requirements, wherein the frequency is initially every Nth VBI, wherein N is a positive integer.

4. The system as recited in claim 1, wherein in response to determining that the full beamforming training procedure can be performed such that it occurs within a period of time corresponding to a single VBI, the circuitry of the transmitter is further configured to perform the full beamforming training procedure during a VBI at an end of a video frame period after a given video frame is transmitted from the transmitter to the receiver.

5. The system as recited in claim 1, wherein in response to determining a full beamforming procedure cannot be performed within a period of time corresponding to a single VBI of a given video frame period, the circuitry of the transmitter is further configured to partition a full beamforming procedure into multiple mini-procedures, wherein to perform said mini-procedures, the transmitter is configured to:
  perform a first portion of the full beamforming training procedure during the single VBI; and
  perform a second portion, different than the first portion, of the full beamforming procedure in a VBI of a video frame period following the given video frame period;
  wherein performing the first portion of the full VBI comprises sending an indication to the receiver that the first portion corresponds to a mini-procedure representing less than a full procedure.

6. The system as recited in claim 1, wherein the circuitry of the transmitter is further configured to adjust a frequency with which beamforming training procedures are performed during a particular sequence of a video game application responsive to the video game application changing a corresponding setting, wherein the frequency is initially every Nth VBI, wherein N is a positive integer.

7. The system as recited in claim 1, wherein in response to detecting an impairment of a link between the transmitter and the receiver, circuitry of one of the transmitter is further configured to:
  select a future VBI based on a detected quality of the link;
  select, based on the detected quality of the link, a beamforming training procedure for the selected future VBI to be a full beamforming training procedure or a mini-procedure comprising a portion of the full beamforming training procedure; and
  send, to the other one of the transmitter and the receiver, a packet with an indication specifying the selected beamforming training procedure will begin at the selected future VBI.

8. A method comprising:
  sending, by a transmitter, a video stream over a wireless link, wherein a video frame period of each frame, in accordance with a periodic time sequence, includes both an active portion during which a single video frame is being transmitted and a vertical blanking interval (VBI);
  performing, by the transmitter, a full beamforming training procedure during a first VBI of a first video frame period, in response to determining that the full beamforming training procedure can be performed such that it occurs within a period of time corresponding to a single VBI; and
  performing, by the transmitter, a beam refinement protocol during an active portion of a second video frame period, where the beam refinement protocol includes a partial sector level sweep that is less than a full sector level sweep.

9. The method as recited in claim 8, wherein the beam refinement protocol process includes multiple partial sector level sweeps during the active portion of the second video frame period.

10. The method as recited in claim 8, further comprising adjusting a frequency with which beamforming training procedures are performed based at least on power savings requirements, wherein the frequency is initially every Nth VBI, wherein N is a positive integer.

11. The method as recited in claim 8, wherein in response to determining that the full beamforming training procedure can be performed such that it occurs within a period of time corresponding to a single VBI, the method further comprises performing the full beamforming training procedure during a VBI at an end of a video frame period after a given video frame is transmitted from the transmitter to the receiver.

12. The method as recited in claim 8, wherein in response to determining a full beamforming procedure cannot be performed within a period of time corresponding to a single VBI of a given video frame period, the method further comprises partitioning a full beamforming procedure into multiple mini-procedures, wherein to perform said mini-procedures, the method further comprises:
  performing a first portion of the full beamforming training procedure during the single VBI; and
  performing a second portion, different than the first portion, of the full beamforming procedure in a VBI of a video frame period following the given video frame period;
  wherein performing the first portion of the full VBI comprises sending an indication to the receiver that the first portion corresponds to a mini-procedure representing less than a full procedure.

13. The method as recited in claim 8, further comprising updating a frequency with which beamforming training procedures are performed during a particular sequence of a video game application responsive to the video game application changing a corresponding setting, wherein the frequency is initially every Nth VBI, wherein N is a positive integer.

14. The method as recited in claim 8, wherein in response to detecting an impairment of a link between the transmitter and a receiver, the method further comprises:
  selecting a future VBI based on a detected quality of the link;
  selecting, based on the detected quality of the link, a beamforming training procedure for the selected future VBI to be a full beamforming training procedure or a mini-procedure comprising a portion of the full beamforming training procedure; and
  sending a packet with an indication specifying the selected beamforming training procedure will begin at the selected future VBI.

15. An apparatus comprising:
  receiver circuitry configured to:
    receive frames of a video stream over a wireless link;
    display frames of the video stream on a display in accordance with a periodic time sequence, wherein a video frame period of each frame includes both an active portion during which a single video frame is being transmitted and displayed and a vertical blanking interval (VBI);
    perform a full beamforming training procedure during a first VBI of a first video frame period, in response to determining that the full beamforming training procedure can be performed such that it occurs within a period of time corresponding to a single VBI; and
    perform a beam refinement protocol during an active portion of a second video frame period, where the beam refinement protocol includes a partial sector level sweep that is less than a full sector level sweep.

16. The apparatus as recited in claim 15, wherein the beam refinement protocol process includes multiple partial sector level sweeps during the active portion of the second video frame period.

17. The apparatus as recited in claim 15, wherein the apparatus is configured to adjust a frequency with which beamforming training procedures are performed based at least in part on power savings requirements, wherein the frequency is initially every Nth VBI, wherein N is a positive integer.

18. The apparatus as recited in claim 15, wherein in response to determining that the full beamforming training procedure can be performed such that it occurs within a period of time corresponding to a single VBI, the apparatus is further configured to perform the full beamforming training procedure during a VBI at an end of a video frame period after a given video frame is transmitted from the transmitter.

19. The apparatus as recited in claim 15, wherein in response to determining a full beamforming procedure cannot be performed within a period of time corresponding to a single VBI of a given video frame period, the apparatus is further configured to partition a full beamforming procedure into multiple mini-procedures, wherein to perform said mini-procedures, the apparatus is configured to:
    perform a first portion of the full beamforming training procedure during the single VBI; and
    perform a second portion, different than the first portion, of the full beamforming procedure in a VBI of a video frame period following the given video frame period;
    wherein performing the first portion of the full VBI comprises sending an indication to the receiver that the first portion corresponds to a mini-procedure representing less than a full procedure.

20. The apparatus as recited in claim 15, wherein in response to detecting an impairment of a link between the transmitter and a receiver, the apparatus is further configured to:
    select a future VBI based on a detected quality of the link;
    select, based on the detected quality of the link, a beamforming training procedure for the selected future VBI to be a full beamforming training procedure or a mini-procedure comprising a portion of the full beamforming training procedure; and
    send a packet with an indication specifying the selected beamforming training procedure will begin at the selected future VBI.

\* \* \* \* \*